Sept. 7, 1954     J. F. WALDMAN     2,688,670
VEHICLE DIRECTIONAL SIGNAL

Filed Dec. 15, 1953

John F. Waldman
INVENTOR.

BY
Attorneys

Sept. 7, 1954      J. F. WALDMAN      2,688,670
VEHICLE DIRECTIONAL SIGNAL
Filed Dec. 15, 1953      3 Sheets-Sheet 2
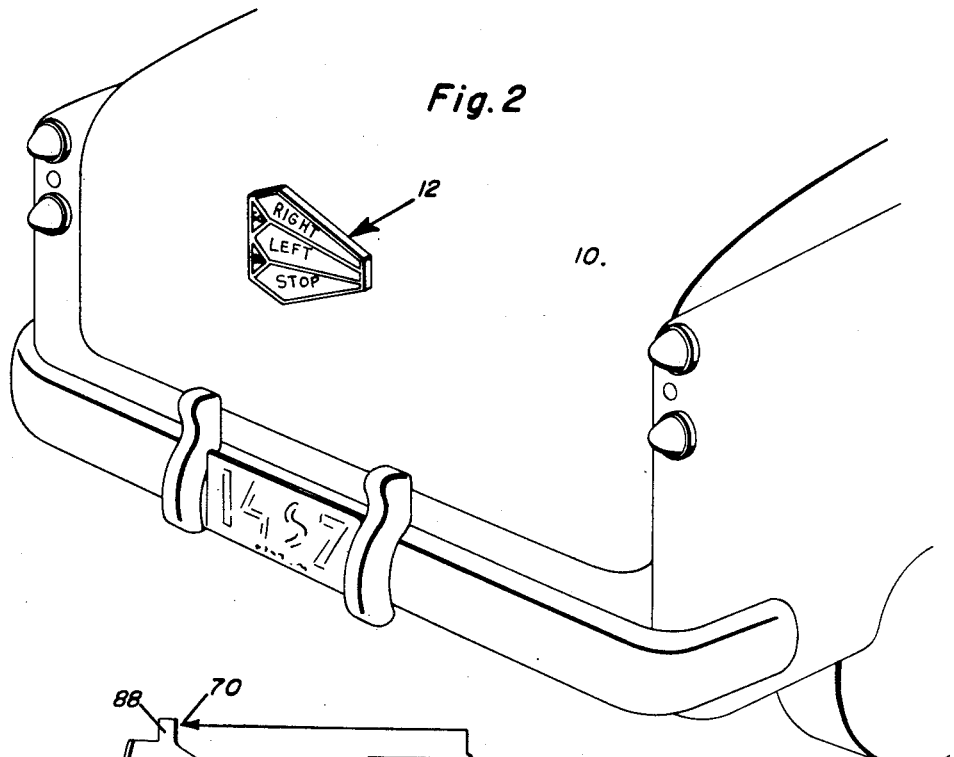
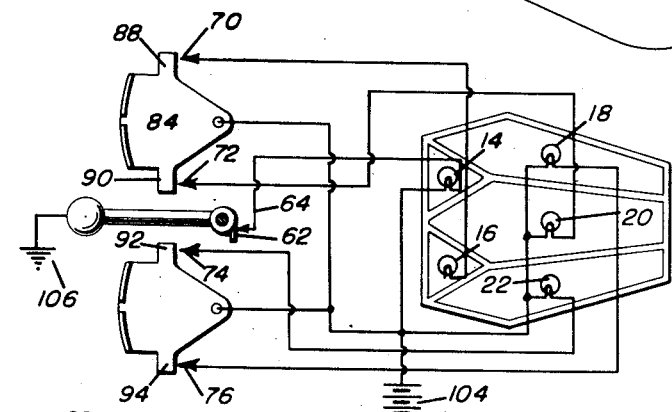
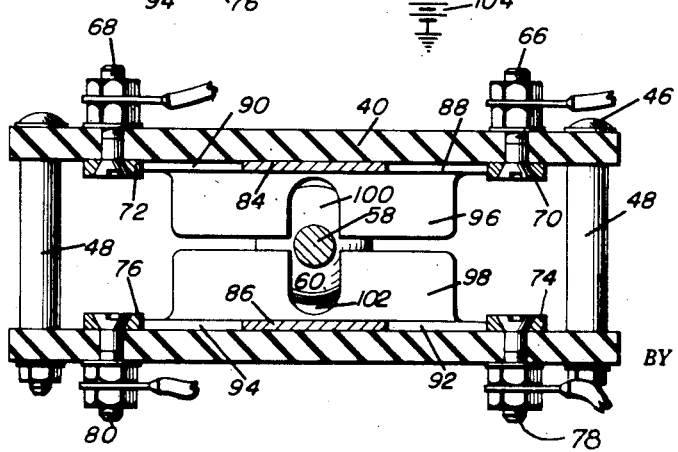
John F. Waldman
INVENTOR.

Sept. 7, 1954   J. F. WALDMAN   2,688,670
VEHICLE DIRECTIONAL SIGNAL
Filed Dec. 15, 1953   3 Sheets-Sheet 3

John F. Waldman
INVENTOR.

Patented Sept. 7, 1954

2,688,670

UNITED STATES PATENT OFFICE 2,688,670

VEHICLE DIRECTIONAL SIGNAL

John F. Waldman, Enid, Okla.

Application December 15, 1953, Serial No. 398,340

4 Claims. (Cl. 200—61.27)

This invention relates to an accessory for an automotive vehicle and more particularly for an indicator of the direction of travel of the vehicle and to means for actuating the indicator.

The primary object of this invention resides in the provision of a vehicle directional signalling attachment adapted to be positioned on an automobile or like vehicle and in the provision of means for actuating the signal device adapted to be mounted on the steering column of the vehicle and to be operated in a very similar manner to that of the normal manner of operation of an automobile gear shift lever.

Incorporated in the present invention is a signal device of the type disclosed in the design patent 168,720 designated for a Vehicle Directional Signal. This signal device is electrically operatively connected to a switching apparatus whereby the separate and distinct lamps mounted within the signal are selectively actuated to inform another motorist or pedestrian of the intended direction of travel of the vehicle.

Still further objects and features of this invention reside in the provision of a vehicle directional signalling apparatus that is strong and durable, simple in construction and manufacture, capable of being readily installed on any conventional make or model of automotive vehicle, which is inexpensive to construct yet which is highly attractive in appearance.

These, together with the various ancillary objects and features of the invention which wil become apparent as the following description proceeds, are attained by this vehicle directional signalling apparatus, a preferred embodiment of which has been illustrated in the accompanying drawings by way of example only, wherein:

Figure 2 is a perspective view illustrating the manner of attachment of one of the signal devices on the rear end of a vehicle;

Figure 4 is a vertical sectional view as taken along the plane of line 4—4 in Figure 3 and illustrating the manner in which the operating lever is adapted to engage the movable contacts;

Figure 8 is a circuit diagram illustrating the various electrical connections utilized in this invention.

Figure 1:
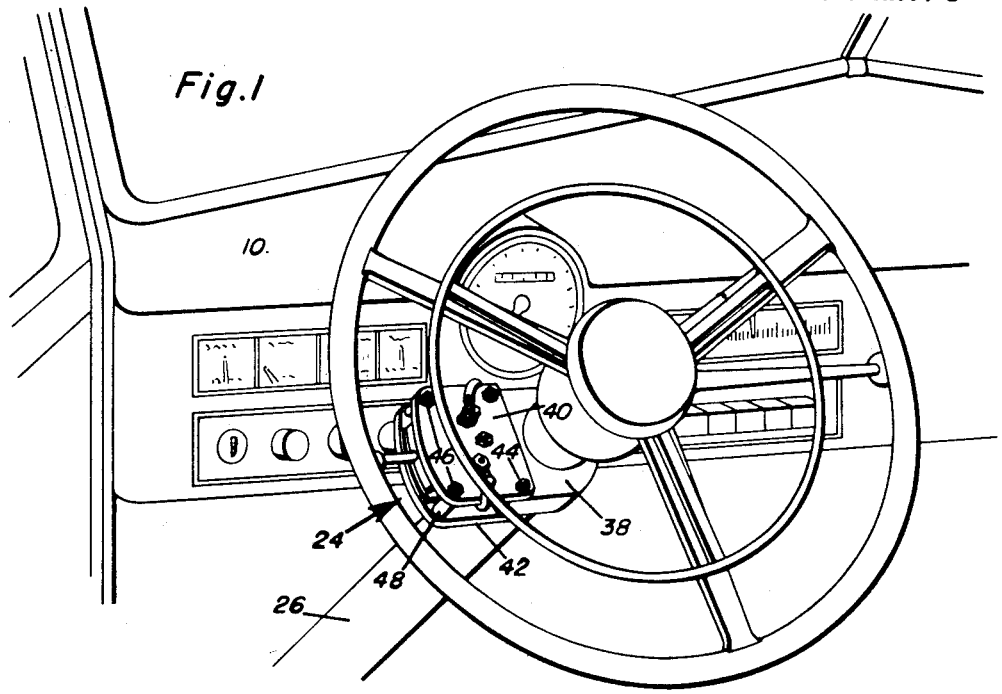
Figure 1 is a perspective view illustrating the manner of attachment of the switching apparatus on a steering column of a vehicle.
Figure 5:
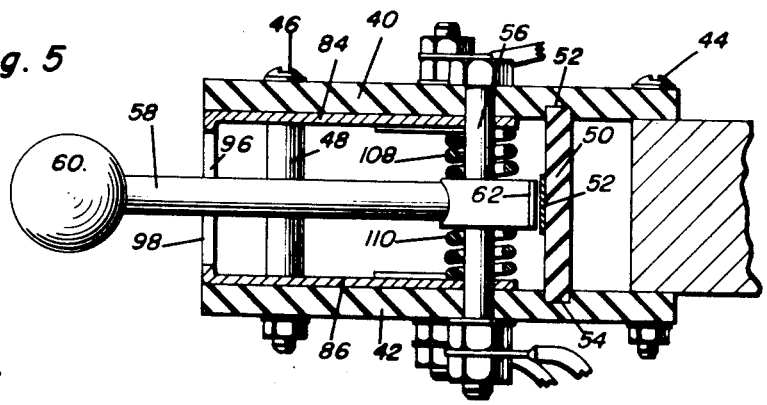
Figure 5 is another vertical sectional view as taken along the plane of line 5—5 in Figure 3 illustrating the resilient means utilized for holding the movable contacts and operating lever in proper position.
Figure 7:
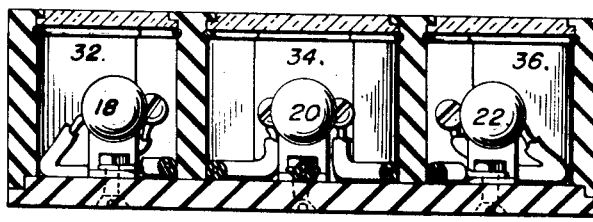
Figure 7 is a vertical sectional view as taken along the plane of line 7—7 in Figure 6.
Figure 6:
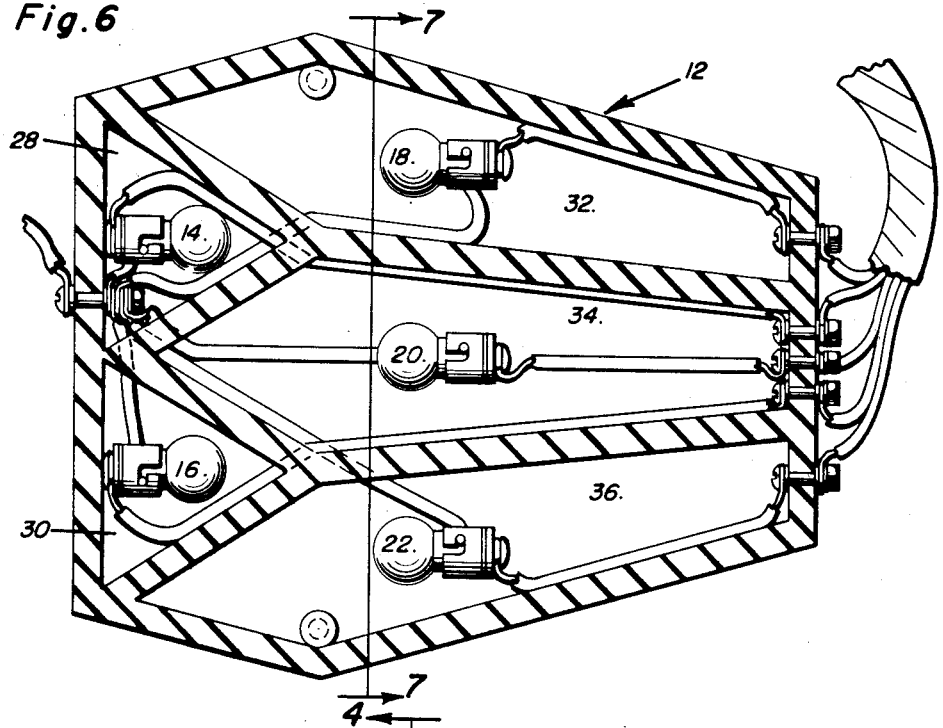
Figure 6 is a sectional view illustrating the construction of the signal device in detail.
Figure 3:
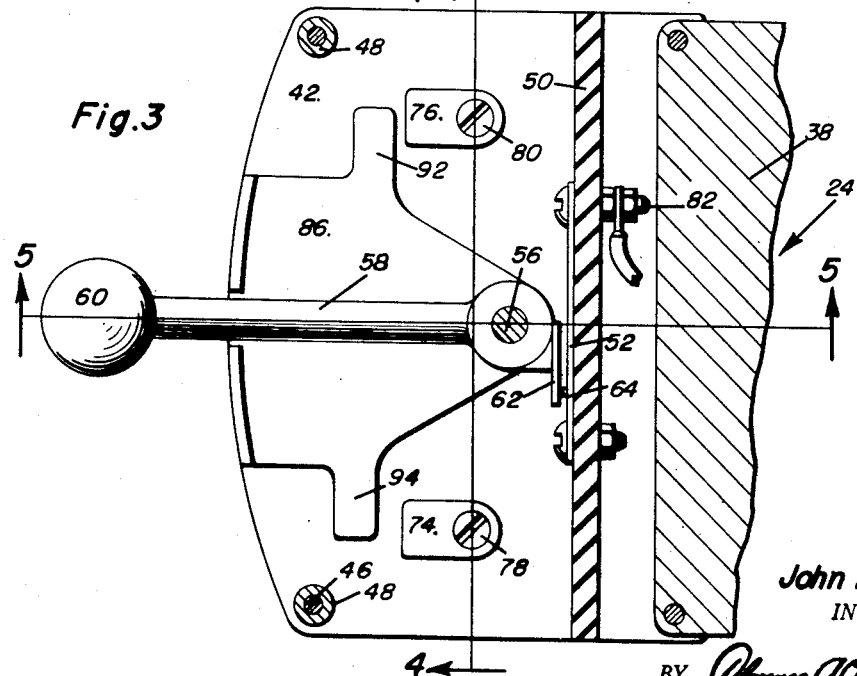
Figure 3 is a sectional detail view illustrating in plan the relative arrangement of parts of the switching apparatus.

With continuing reference to the accompanying drawings wherein like reference numerals designate similar parts throughout the various views, reference numeral 10 generally designates any conventional make and model of automotive vehicle on which the signal device 12 is adapted to be installed, the signalling device including a plurality of separately excited lamps 14, 16, 18, 20 and 22 which are electrically operatively connected to and actuated by a switching apparatus generally indicated by reference numeral 24 and adapted to be mounted on the steering column or post 26 of the vehicle 10.

The signal device 10 is divided into chambers 28, 30, 32, 34, and 36 in which the respective lamps 14, 16, 18, 20 and 22 are situated and covering the respective chambers are windows which preferably have the indicia "go," "stop," "right," "left," and "stop" thereon. Further, these windows may be colored as desired.

The switching apparatus 24 includes a block 38 adapted to be secured in any convenient manner to the steering column 26 of the vehicle 10. This block 38 may embrace the steering column 26 and has attached thereto an upper plate 40 and a lower plate 42 both of which are formed from an electrically insulative material. Bolts as at 44 extend through the upper and lower plates 40 and 42 and through the block 38 to secure the plates 40 and 42 to the block 38 in spaced relationship. Other bolts 46 cooperating with spacers 48 hold the outer ends of the plates 40 and 42 in spaced relationship.

A wall 50 of insulative material having a fixed contact plate 52 mounted thereon is secured between the plates 40 and 42 in notches 52 and 54. A shaft 56 is mounted in the plates 40 and 42 and extend therebetween. Mounted on the shaft 56 is an operating lever 58 having a knob handle 60 or other suitable easily grasp arrangement. The lever 58 has secured thereto a movable contact element 62 adapted to engage a projecting contact 64 mounted on the fixed contact plate 52.

Secured to the upper plate 40 by means of bolts 66 and 68 are a pair of fixed contacts 70 and 72. It is to be noted that nuts are threaded on the bolts 66 and 68 to make the bolts 66 and 68 terminals for conductors. Likewise, another set of fixed contacts 74 and 76 are held in place by means of bolts 78 and 80 which also form terminals for the connection of suitable conductors. It is to be noted that the bolt 82 holding the plate 52 to the wall 50 forms a terminal for connecting a suitable conductor to the contact element 64. Additionally, the shaft 56 has its end threaded to form a terminal for connecting a common ground wire to the shaft 56 and hence the movable contact 62 and to the movable contact plates 84 and 86 which are mounted on the shaft 56. The upper movable contact member 84 is provided with a pair of contact wings or elements 88 and 90 and the lower contact element likewise has the contact elements 92 and 94 integrally formed therewith. The movable contact members 84 and 86 are provided with arcuate converging flanges 96 and 98 which have recesses 100 and 102 therein for reception of the shaft 58.

As can be readily seen from an inspection of Figures 4 and 8 upon movement of the operating lever 58 into the recess 100 and thence to the left, the movable contact member 84 will be rotated so as to cause the contact wing 92 to engage the fixed contact 76. This will complete an operative electrical circuit from a battery 104 to the ground 106. This completes a circuit from the battery 104 to the lamp 16 behind the reverse ends. Upon movement of the movable contact member 86 to the right the contact element 90 will engage the fixed contact 72 to complete an operative electrical circuit to the lamp 20 behind the lens illustrating left. Upon movement of the operating lever 70 downwardly into the recess 102 and thence to the left, the contact member 86 will be moved to cause the contact wing or element 92 to engage the fixed contact 74 completing an operative electrical circuit to the lamp 22 behind the lens marked stop. Further, upon movement of the lever 56 to the right the movable contact 86 will be actuated to cause the contact wing 94 to engage the fixed contact 76 thereby completing an operative electric circuit to the lamp 18 behind the lens indicating a right direction.

It is to be noted that coil springs 108 and 110 yieldingly engage the lever 58 and the upper and lower movable contact members 84 and 86 respectively. Hence, the operating lever 58 is continuously resiliently urged to the neutral position whereby the contact element 64 will be engaged by the movable contact 62 to thereby complete an operative electrical circuit to the lamp 14 behind the lens indicating "go."

Since from the foregoing the construction and advantages of this vehicle indicating apparatus are readily apparent, further description is believed to be unnecessary. It is to be noted that the operation of the lever 58 utilizing the handle 60 is in effect very similar to that of a stated gear shift lever utilizing the conventional "H" movement so well known to motorists. This is highly advantageous inasmuch as it is very easy for the motorist to become completely familiar with the operation of this device and its versatility.

Since numerous modifications and equivalents will become readily apparent to those skilled in art after a consideration of the foregoing specification and accompanying drawings, it is not intended to limit the invention to the precise embodiment shown and described, but all suitable equivalents may be readily resorted to which fall within the scope of the appended claims.

What is claimed as new is as follows:

1. A vehicle direction signal device for use in selectively actuating lamps mounted on a vehicle comprising upper and lower spaced plates, a shaft journalled in and extending between said plates, a plurality of fixed contacts carried by said spaced plates, an operating lever rotatably mounted on said shaft, and a pair of movable contact members rotatably mounted on said shaft engageable by said lever and rotatable into engagement with said fixed contacts, said spaced plates being formed of electrically insulative material, a wall secured to and extending between said spaced plates, a contact plate mounted on said wall, and a contact element mounted on said lever adapted to engage said contact plate.

2. A vehicle direction signal device for use in selectively actuating lamps mounted on a vehicle comprising upper and lower spaced plates, a shaft journalled in and extending between said plates, a plurality of fixed contacts carried by said spaced plates, an operating lever rotatably mounted on said shaft, and a pair of movable contact members rotatably mounted on said shaft engageable by said lever and rotatable into engagement with said fixed contacts, said spaced plates being formed of electrically insulative material, a wall secured to and extending between said spaced plates, a contact plate mounted on said wall, and a contact element mounted on said lever adapted to engage said contact plate, and a pair of springs concentrically positioned about said shaft, each of said springs yieldingly engaging said lever and one of said movable contact members.

3. A vehicle direction signal device for use in selectively actuating lamps mounted on a vehicle comprising upper and lower spaced plates, a shaft journalled in and extending between said plates, a plurality of fixed contacts carried by said spaced plates, an operating lever rotatably mounted on said shaft, and a pair of movable contact members rotatably mounted on said shaft engageable by said lever and rotatable into engagement with said fixed contacts, said spaced plates being formed of electrically insulative material, a wall secured to and extending between said spaced plates, a contact plate mounted on said wall, and a contact element mounted on said lever adapted to engage said contact plate, and a pair of springs concentrically positioned about said shaft, each of said springs yieldingly engaging said lever and one of said movable contact members, each of said movable contact members having a flanged portion with a recess therein for reception of said lever.

4. A vehicle direction signal device for use in selectively actuating lamps mounted on a vehicle comprising upper and lower spaced plates, a shaft journalled in and extending between said plates, a plurality of fixed contacts carried by said spaced plates, an operating lever rotatably mounted on said shaft, and a pair of movable contact members rotatably mounted on said shaft engageable by said lever and rotatable into engagement with said fixed contacts, said spaced plates being formed of electrically insulative material, a wall secured to and extending between said spaced plates, a contact plate mounted on said wall, and a contact element mounted on said lever adapted to engage said contact plate, and a pair of springs concentrically positioned about said shaft, each of said springs yieldingly engaging said lever and one of said movable contact members, said movable contact members having convergingly extending flanges appended thereto, said flanges having recesses therein for reception of said lever, said movable contact members each having contact elements attached thereto.

References Cited in the file of this patent

UNITED STATES PATENTS

| Number | Name | Date |
| --- | --- | --- |
| 1,612,560 | Balch | Dec. 28, 1926 |
| 1,829,037 | Bobroff | Oct. 27, 1931 |
| 1,997,780 | Newton | Apr. 16, 1935 |